United States Patent [19]

Thorud

[11] 4,047,367
[45] Sept. 13, 1977

[54] ROTARY MOWER BAGGING APPARATUS

[75] Inventor: Richard A. Thorud, Bloomington, Minn.

[73] Assignee: The Toro Company, Minneapolis, Minn.

[21] Appl. No.: 494,051

[22] Filed: Aug. 2, 1974

[51] Int. Cl.² ........................................... A01D 35/22
[52] U.S. Cl. ..................................... 56/202; 56/320.2
[58] Field of Search .................... 56/202, 320.2, 17.4; 150/1, 2, 2.6, DIG. 1; 248/99, 100, 101

[56] References Cited

U.S. PATENT DOCUMENTS

| | | | |
|---|---|---|---|
| 3,192,692 | 7/1965 | Slemmons | 56/202 |
| 3,568,421 | 3/1971 | Smith et al. | 56/320.2 |
| 3,706,190 | 12/1972 | Taub | 56/202 |
| 3,726,069 | 4/1973 | Cope | 56/202 |
| 3,750,378 | 8/1973 | Thorud et al. | 56/320.2 |
| 3,797,214 | 3/1974 | Erdman et al. | 56/202 |
| 3,805,499 | 4/1974 | Woelffer et al. | 56/320.2 |

*Primary Examiner*—Russell R. Kinsey
*Attorney, Agent, or Firm*—Merchant, Gould, Smith, Edell, Welter & Schmidt

[57] ABSTRACT

Bagging apparatus for a rotary mower in which a grass-catching bag and discharge chute may be detached from the mower in a one-handed operation by the user. A portion of the apparatus connecting the mower housing with the chute and bag also functions as a discharge deflector when the mower is used with the bag removed. The downward deflector is spring-biased toward the downward position and slidably engages a chute to which the grass-catching bag may be attached. Also disclosed is a hook-shaped locking slot on the top of the mower housing into which a projection on the chute may be urged by the spring-biased deflector to positively fasten the chute and mower housing during operation in a bagging mode.

13 Claims, 7 Drawing Figures

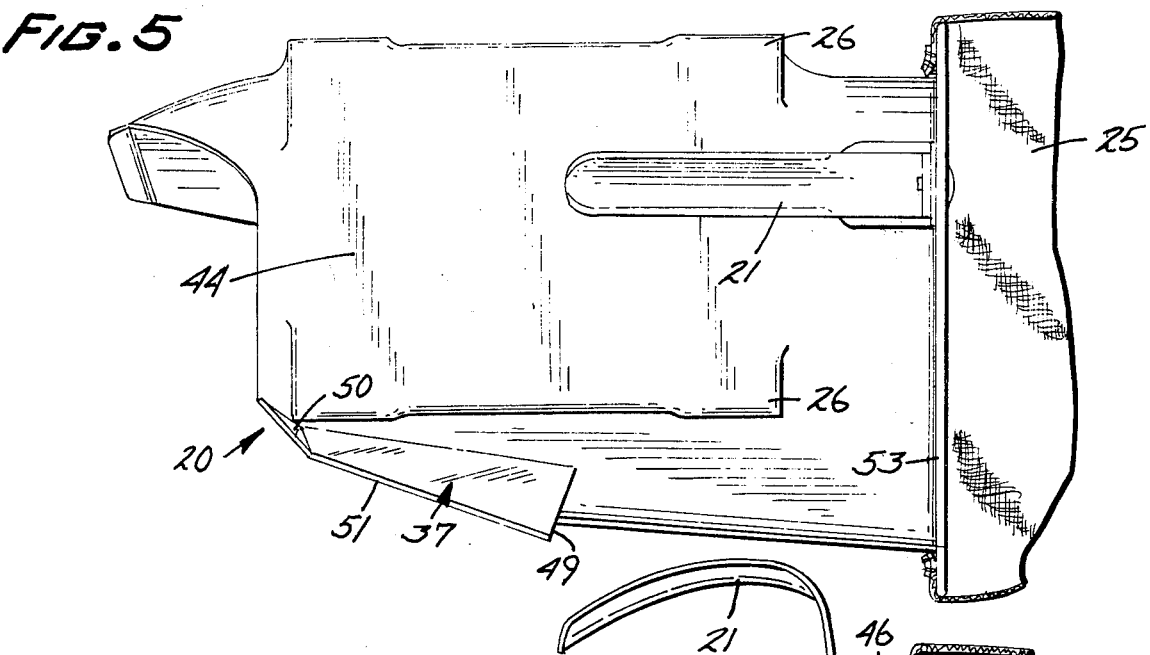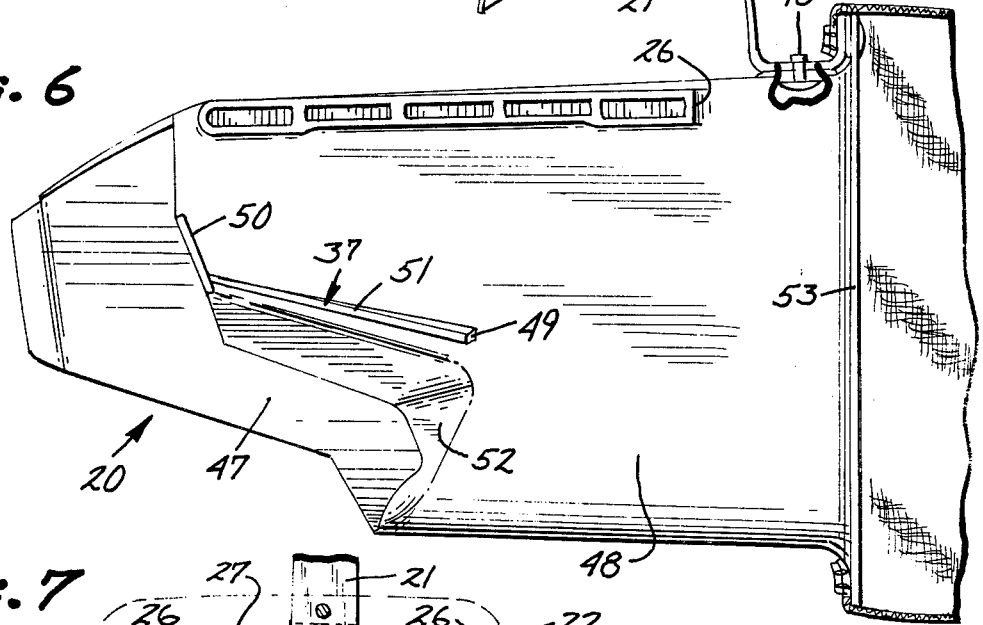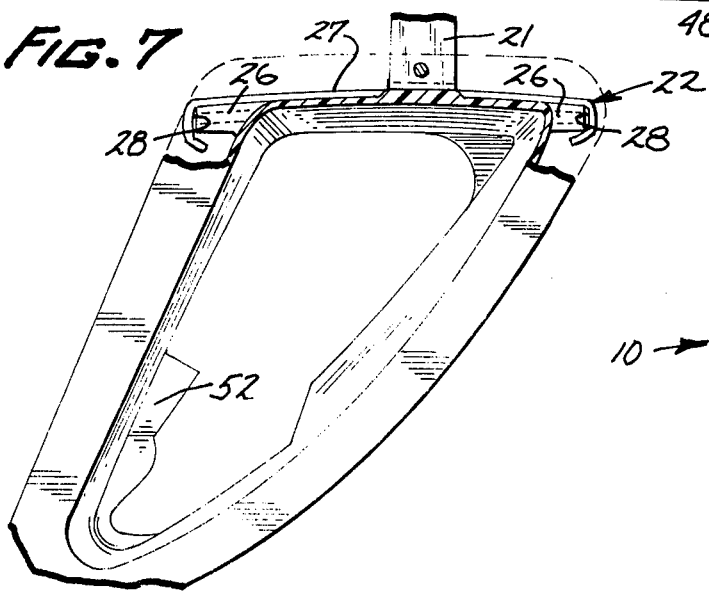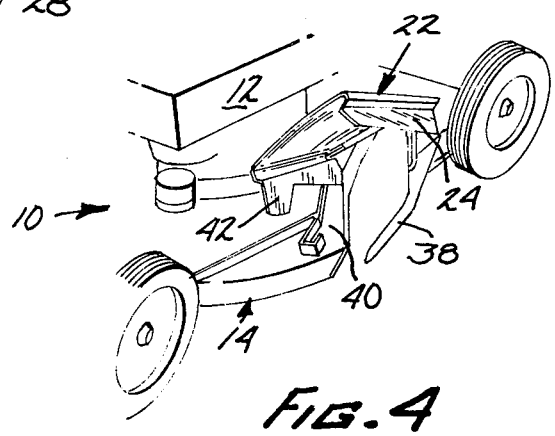

ROTARY MOWER BAGGING APPARATUS

BACKGROUND OF THE INVENTION

This invention relates generally to rotary lawn mowing apparatus and more particularly concerns discharge and grass-catching apparatus for such lawn mowers.

Rotary lawn mowers, as used herein, includes mowers with a cutting blade rotating at substantial speed about a vertical axis within a housing. Prior art rotary mowers have side discharge openings in their housing for exit of cut grass particles. These discharge openings typically define a chute directed either substantially transverse to the intended direction of travel of the mower at an acute angle thereto. It is also known to provide such mowers with some means for collecting grass clippings in the event that the growth being mowed is so substantial that discharge of grass clippings onto the lawn would result in an unsightly accumulation or would actually be harmful to lawn growth.

However, prior art bagging apparatus for connection to the side discharge opening on the housing has a number of significant shortcomings. One of the foremost of these shortcomings is unwieldy chute apparatus making disconnecting and reconnecting of the bag assembly difficult. Prior bagging apparatus for rotary mowers has nomally required two-handed disconnection of the grass-catching bag from the mower housing. This can be a constant source of irritation and difficulty for the user. Another disadvantage of prior art bagging apparatus having a side discharge is that with the bag and chute assembly removed, the mower housing sometimes does not provide sufficient protection to users, since the discharge opening is not covered by a downward deflector when the bagging apparatus is removed.

A further disadvantage of prior art bagging apparatus is that often a "plug" or wad of grass tends to form in the chute area between the main section of the bag and the housing. This plug of grass might not be removed in disconnection of the bag for emptying. Therefore it sometimes is necessary to manually clear the chute attached to the housing, a chute which is often relatively inaccessible.

The present invention is improved bagging and discharge apparatus for a rotary mower in which disconnection of the bag and a relatively rigid chute member from the housing is easily accomplished. Upon removal of the chute, a spring-biased deflector with which the chute normally mates during bagging, drops downward to provide downward deflection of cut particles so that the mower may be immediately used as a side discharge mower without the bagging apparatus, the deflector providing substantial protection against upward discharge of cut particles. In addition the spring-biased deflector and chute, together with a portion of the housing, provide a positive locking connection between the bagging attachment and housing.

SUMMARY OF THE INVENTION

In accordance with the invention, bagging apparatus for a rotary mower which has a housing with a discharge opening for discharge of cut grass particles from the interior of the housing is provided. Hingedly attached to the housing and hinged about a generally horizontal axis are deflector means which are spring urged downwardly to restrict and downwardly direct the stream exiting the discharge opening. A chute member defining a passageway therein has one end adapted to mate with the discharge opening. In addition the chute member and deflector means are provided with structure providing mating engagement between them, and longitudinal insertion of the chute member urges the deflector means upward so that the chute may contact and cover the discharge opening.

In certain embodiments, the chute member may have a protrusion capable of use as a latch in combination with a hook-shaped ridge in the top of the housing. When the chute member engages the deflector means and covers the discharge opening, the spring-biased deflector provides a downward pressure on the chute to maintain positive engagement of the protrusion and ridge.

In addition, the deflector means may be formed to define a longitudinally extended channel while chute member has a top surface with a pair of oppositely directed rails received within the channel during engagement of the deflector and chute member. This provides further positive engagement between the deflector and chute member when the bagging apparatus is being used, at the same time permitting easy disconnection of the chute and its attached bag.

BRIEF DESCRIPTION OF THE DRAWINGS

Other objects and advantages of the invention will become apparent upon a reading of the detailed description which follows. Referring particularly to the drawings, wherein the use of like reference numerals throughout the several views indicates like elements:

FIG. 4 is a side perspective view of the discharge area of the mower of FIG. 1 showing the hinged deflector means pivoted upward to reveal the housing structure and shape of the discharge opening;

FIG. 5 is a plan view of a chute member constructed according to a preferred embodiment of the present invention with a grass-catching bag attached to one end of the chute member, portions thereof being cut away;

FIG. 6 is a side view of the chute and associated bag of FIG. 5, portions thereof being cut away; and FIG. 7 is a side elevational view of the chute member and bag of FIG. 5, illustrating in particular the cross-sectional shape of the chute and structure therein which prevents deposit of a plug of cut particles proximate the housing during disconnection and the engagement of the deflector means and rails formed into the chute in the bagging mode.

While the invention will now be described in connection with preferred embodiments, it should be clearly understood that the invention is not limited in scope to those embodiments. On the contrary, all alternatives, modifications and equivalents included within the spirit and scope of the invention as defined by its appended claims are covered.

DETAILED DESCRIPTION OF THE INVENTION

Figure 1:
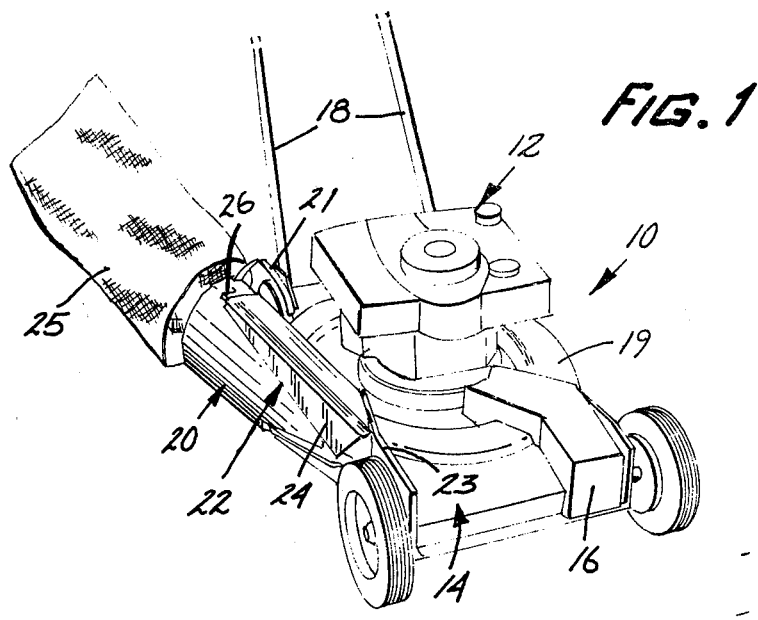
FIG. 1 is a perspective view of a rotary mower constructed according to a preferred embodiment of the present invention in a bagging mode, that is, with chute and grass-catching bag attached to the mower, certain portions of the mower being cut away.

Turning first to FIG. 1, there is shown, in perspective, a rotary lawn mower generally designated 10 constructed according to a preferred embodiment of the present invention. Rotary mower 10 includes an internal combustion engine generally designated 12 which drives a grass cutting blade for rotation about a vertical axis. The mower blade (not shown) is substantially enclosed by a mower housing 14 to which wheels are attached for movement of the mower over a lawn surface at a controlled height above it. In the particular embodiment shown, engine 12 provides drive to the front wheels by means of a gear drive mechanism identified with reference numeral 16. Mower 10 also has an operator handle 18, portions thereof being broken away in FIG. 1 since handle structure is not a significant part of the present invention.

Mower housing 14 has a generally circular scroll or channel 19 providing a passageway for grass clippings to be carried by airflow inside the chamber defined by housing 14 and the ground surface, as well as transported by blade-imparted momentum. Channel 19 ends at the left side of housing 14 in a discharge opening not visible in FIG. 1, since it is covered by apparatus for use of the mower in the bagging mode.

Shown connected to housing 14 at the discharge opening is discharge chute 20. Discharge chute 20 engages a deflector means 22, which is hingedly attached to housing 14 along a ridge portion 23 thereof. Deflector means 22 extends generally tangentially outward from channel 19 at the discharge opening in housing 14, and is hinged at an acute angle to its longitudinal axis. Deflector means 22 also includes a side wall 24 of trapezoidal shape projecting generally perpendicular and downward with respect to a rounded top wall of deflector means 22. Side wall 24 provides additional discharge chute definition and closure between housing 14 and discharge chute 20 when the mower is in the bagging mode.

Attached to discharge chute 20 about a flange at one end thereof by an expansible band or other means is a grass-catching bag 25, a portion of which is cut away since it is not essential to the present invention. The opposite end of grass-catching bag 25 (not shown) may be self-supporting or secured by means of a bracket attached to operator handle 18. For removal of gathered clippings from bag 25, its opposite end may have a zipper or other opening means for removal of grass clippings therefrom. Discharge chute 20 also has a cantilevered handle 21 fastened to the top surface of chute 20 to facilitate handling of discharge chute 20 during disconnection and removal from the mower for emptying purposes. As will appear more clearly in other views, chute 20 may define a pair of oppositely directed substantially parallel projection means, which may be a pair of oppositely extended rails 26, which define a longitudinal axis of the chute for insertion in a mating channel formed in deflector means 22.

Figure 2:
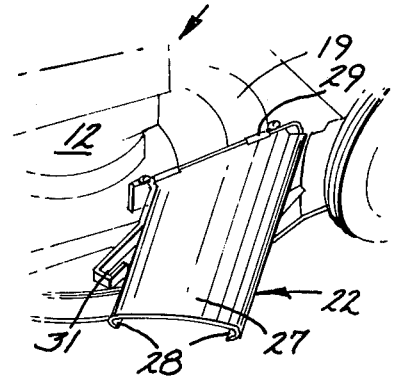
FIG. 2 is a side view in perspective of the discharge area of the mower of FIG. 1 in the discharge mode, that is, with the chute and bag removed particularly emphasizing the position of the deflector means.

FIG. 2 shows a side perspective of a portion of the structure of FIG. 1 with chute 20 and grass-catching bag 25 removed and with deflector means 22 in a position which permits use of the mower in a side discharge or non-bagging mode. Deflector means 22 has a generally rounded top wall 27. At the edges of rounded top wall 27, deflector 22 is formed to define a pair of opposed grooves or channels 28 which extend generally axially of deflector means 22 and are adapted to receive rails 26 of chute 20 and provide means for mating engagement of chute 20 and deflector 22. At the end adjacent housing 14, deflector 22 has a hinged portion 29 formed therein which substantially encircles and captivates a hinge spring 30. Hinge spring 30 defines the axis of rotation of hinged deflector means 22 and continually spring-biases deflector 22 downwardly so that deflector 22 is brought into contact with the upper and side surfaces of housing 14 when the mower is in a discharge mode. Deflector 22 may be constructed from sheet steel or any other suitable material with sufficient strength to provide the necessary structural rigidity.

Also shown in FIG. 2 are stop means 31 in the form of a hook-shaped locking ridge projecting from the top surface of housing 14. Locking ridge 31 consists of a barrier wall perpendicular to the top surface of housing 14 which may, in certain embodiments, be cast into housing 14. Hook-shaped locking ridge 31 is provided for engagement with means projecting from chute 20 and the two elements coact as shown in a later figure to provide a solid, positive connection between the housing, deflector and chute when the machine is used in a bagging mode. Also appearing in the figure is a portion of a mating surface on housing 14 on which the front surface of chute 20 rests when fastened to the housing in the bagging mode.

Figure 3:
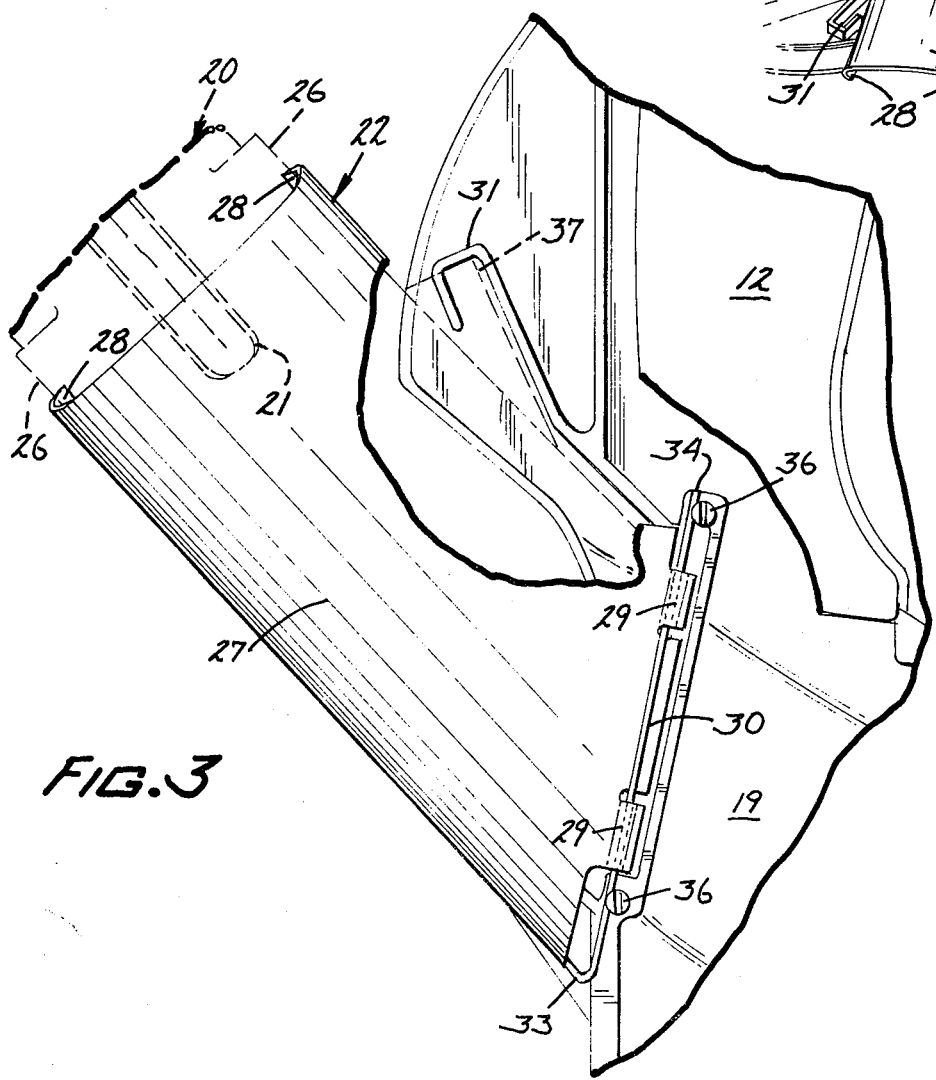
FIG. 3 is an enlarged plan view of the discharge area of the mower of FIG. 1, portions thereof being cut away to illustrate the relationship between the chute, deflector and a protruding ridge on the housing.

Moving now to FIG. 3, there is shown a fragmentary plan view of housing 14 enlarged to show the details of construction of housing 14 and connection of deflector means 22 to housing 14 near the discharge opening. Portions of delfector 22 are cut away in FIG. 3 and a portion of chute 20 is shown using dotted lines to illustrate connection between the chute and the housing.

Further details of the construction of the hinge for deflector 22 are also depicted in FIG. 3. In particular, hinge spring 30 is shown more clearly with an end 33 thereof formed at an angle to the axis of hinge rotation and fixedly attached to side wall 24 of deflector 22 to spring-bias deflector 22 downward into contact with housing 14, thus covering the discharge opening when the mower is in a discharge rather than a bagging mode. Opposite end 34 of hinge spring 30 is formed downward and to housing 14 by means of engagement of an end thereof with a hole in the housing (not shown). The major, axial portion of hinge spring 30 rides in a groove formed into ridge portion 23 and is held in the groove by each of a pair of machine screws 36, the heads of which extend thereover. Hinged portion 29 of deflector means 22 is formed into three curled hinge loops, a central loop and two oppositely curled loops, with hinge spring 30 extending through these loops to function as a hinge pin.

Also shown in FIG. 3 in dotted line form is discharge chute 20. A portion of top wall 27 of deflector 22 is cut away to reveal the interaction between chute 20 and hook-shaped locking ridge 31. Hook-shaped locking ridge 31 is formed in the top of housing 14. Ridge 31 extends obliquely outward from the axis of deflector 22, then at a right angle to itself, then forms a second right angle, all defining a hook-shaped ridge. Discharge chute 20 has a ramp latch 37 shown by means of dotted lines. Ramp latch 37 projects outward from the bottom of chute 20 and includes a rear stop surface which is positively locked into ridge 31.

FIG. 4 shows a side perspective of the discharge area similar to FIG. 2, but with deflector 22 pivoted upwards to a position not encountered during normal operation, but used here to illustrate the discharge opening in housing 14. A deflector bar 38 extends generally outward and backward along the bottom edge of housing 14. Deflector bar 38 extends across the bottom of the discharge opening to downwardly deflect foreign materials which might be impacted by the mower cutting blade. On the opposite side of the discharge opening, housing 14 extends inward of locking ridge 31 to form a support surface 40 for a portion of the discharge chute 20. Because deflector means 22 has been canted upward in FIG. 4, side wall 24 thereof is clearly visible. As is depicted with clarity in FIGS. 1 and 4, side wall 24 is trapezoidal in shape with its greatest downward extent closest to the hinged end of deflector 22. Its lower edge tapers upward and to the free end of deflector 22. This structure results in two advantages. In the bagging mode, greatest protection and closure is provided proximate housing 14. In the non-bagging mode, the bottom edge rests against housing 14 as a result of spring-biasing, thus maintaining a downward discharge path defined by deflector 22. Deflector means 22 also has an opposing side wall 42 having a bottom edge cut to mate with the housing 14 and chute 20. Opposing wall 42 is also directed essentially perpendicularly to top surface 27. Both side walls function to provide additional security of enclosure when the chute is in the bagging mode, and, in the discharge mode, tend to channel flow and deflect it in a uniform stream.

FIGS. 5, 6 and 7 are various views illustrating specific features of a particular embodiment of discharge chute 20 and associated structure. Chute 20 has a generally planar top wall 44 flanked by a pair of guide rails 26 directed oppositely outward and parallel to one another as edges of wall 44. Rail members 26 are longitudinally extended along the axis of the chamber defined by chute member 20 and have substantial structural rigidity.

In one preferred embodiment constructed by applicant, discharge chute 20 was molded of polyethylene material. In that embodiment, as illustrated particularly in FIG. 6, rails 26 were configured to a number of individual four walled chambers, each sharing a wall with an adjacent chamber. The purpose of such construction was to facilitate molding of the rails and conserve material. However, any material of suitable strength and rigidity such as sheet metal, aluminum, or other material could be used for construction of the discharge chute. Also, while the preferred embodiment has opposed rails which mate with the channel formed into deflector 22 to align and connect the deflector and chute, it will be appreciated that any means on the chute and deflector which cooperate to positively align and connect the chute member and deflector in longitudinal engagement would be an acceptable alternative.

Cantilevered handle member 21 is forwardly directed and attached to top wall 44 of chute 20 by means of a rivet attachment 46. The cantilevered handle is particularly useful as it provides for easy connection and disconnection of the chute by the mower operator.

Chute 20 has a first forwardly directed outer side wall 47 which extends substantially further forward than a second opposed side wall portion 48. Side wall 47 functions as a continuation of the inner surface of housing 14. Grass clippings cut in the chamber defined by the ground surface and the inner surface of housing 14 are circulated around the housing's inner surface to the discharge chute where the clippings tend to follow side wall 47 into a bag attached to the chute. In order that side wall 47 may function as a continuation of the housing, it is necessary that it extend substantially farther forward than side wall 48 since the chute mates with the deflector axially and the axis of the deflector 22 is at an acute angle to the direction of travel of the mower rather than transverse to it.

As shown in FIG. 7, a view of chute 20 from the right side with portions of the top of bag 25 cut away, the general shape of chute 20 is a distorted obtuse triangle in which top wall 44 and side wall 48 are sides of the obtuse angle and the longest side, side wall 47, is arcuate in shape. This obtuse triangular configuration provides a side bagging connection to the mower which is compact and uses relatively little lateral space beyond the width of cut of the mower.

Inner side wall 48 of chute 20 is provided with a ramp latch 37 as previously mentioned. Ramp latch 37 comprises a projecting wing or piece of material or other projection fixed to chute member 20. Latch 37 has a rear stop surface 49 which mates with hook-shaped locking ridge 31 and positively locks chute 20 into place when deflector and chute are in engagement by means of downward pressure exerted by hinge spring 30. At the end of ramp latch 37 opposite surface 49 is a reinforcing rib 50 extending outward from wall 48, which also provides a mating surface for contact between chute 20 and housing 14. Ramp latch 37 is generally ramp shaped, that is it has a width or outward projection distance which increases substantially from its beginning at reinforcing rib 50 to the rear stop surface 49. This causes the outer edge 51 of latch 37 to function as a ramp, facilitating connection of chute 20 to the mower for operation in the bagging mode, yet preventing accidental disconnection.

Below latch 37 and extending generally inward of the chamber defined by the major portion of side walls 48, 47 and top surface 44 is an inwardly projecting clearing wall 52 having a first generally planar portion which extends angularly backward and downward from the front of chute 20 and a second non-planar portion shaped to match the surface of housing 14 along support surface 40. Inwardly projecting wall 52 has two important functions. First, it provides a contact area between chute 20 and support surface 40 adjacent latch 37 to provide a more positive connection between the chute, deflector and housing. Second, when complete filling of the grass-catching bag occurs while the mower is in the bagging mode, inwardly projecting wall 52 enables chute 20 to retain the grass clippings present in the chute when the chute and bag are disconnected from the mower for emptying purposes, and cleaning of the mower discharge opening is therefore not normally required.

It should also be noted, as shown in FIGS. 5 through 7, that discharge chute 20 has means 53 for fastening a grass-catching bag thereto. In the embodiment shown, these means comprise a bag accepting flange 53 extending generally transverse to the axis of the chamber defined by chute 20. A bag with elasticized front opening may fit around the flange and form a debris tight closure between the bag and the chute. As previously mentioned, the opposite end of the bag (not shown) may be zippered or otherwise configured to readily provide for dumping of the collected grass cuttings and may have a bracket or other adapting means which hang the bag from the operator handle or portion thereof.

In use of a rotary mower provided with the present invention in the discharge mode, where collection of the grass clippings and cut debris is not desired, deflector 22 is spring urged downward by hinge spring 30 into a position where its side walls contact housing 14. Deflector 22 channels and downwardly directs the discharge flow of the mower, providing even distribution of clippings and debris to the side of the mower. Side walls 24 and 42 of deflector cover 22 aid in defining a channel for controlled non-hazardous discharge of cuttings.

When operation in the bagging mode is desired, chute 20 with the bag attached thereto by bag accepting flange 53 or by other suitable means in other embodiments may be lifted by the operator using cantilevered handle member 21. The position of deflector 22 with respect to housing 14 just prior to chute and deflector engagement is as shown in FIG. 2. The operator positions discharge chute 20 such that opposed rails 26 begin to engage channels 28. He then exerts an upward lifting motion which lifts deflector 22, opposing the downward urging of hinge spring 30. The operator may then slide chute 20 directly forward until the front surfaces of side walls 47, 48 and inwardly directed wall 52 contact the sides of the discharge opening in housing 14. During this sliding motion, ramp surface 51 of ramp latch 37 will slide past hook-shaped locking ridge 31. When full engagement occurs, rear stop surface 49 will lock chute 20 into place in contact and engagement with housing 14 because of the positive contact surface 49 and ridge 31 maintained by downward spring pressure from deflector 22. For removal of the chute and bag assembly for emptying or changing to the discharge mode, the operator need merely lift chute 20 using cantilevered handle member 21, bringing stop surface 49 completely above locking slot 31. The chute and bag may then be drawn longitudinally backward to disengage opposed rails 26 from channels 28 and disconnect the chute and bag from the mower. The bag may then be readily emptied.

It should be noted that upon disconnection of the bag in this manner, hinge spring 30 will automatically urge deflector 22 downward to provide for operation of the mower in the side discharge mode without need for any further adjustment or addition of other attachments to the mower.

Although the invention has been described in conjunction with specific embodiments, there exist many possible alternatives and variations. For example, while opposed rails and mating channels are used in the deflector and chute disclosed to provide for mating longitudinal engagement, other means providing equivalent satisfactory longitudinal engagement may be perfectly satisfactory. In addition, while a torsion type hinge spring is shown, it will be apparent that other means yieldably urging the deflector downward might well be suitable for the present invention. Certainly, other alternatives and variations will occur to those of skill in the art. Accordingly, it is intended to embrace all such alternatives, modifications, and variations as fall within the spirit and scope of the appended claims.

What is claimed is:

1. Bagging apparatus for a rotary mower having a housing substantially enclosing a blade mounted for rotation about a vertical axis, said housing having a discharge opening for discharge of grass particles cut by said blade from the interior of said housing, comprising:
   a. deflector means hingedly attached to said housing and having a longitudinal axis, said deflector means defining a discharge passageway along said longitudinal axis and pivotable about a generally horizontal axis so that pivotal movement of the deflector means covers and uncovers said discharge opening;
   b. yieldable means for urging said deflector downward toward the top surface of said housing;
   c. a tubular chute member including a top wall and adjoining side walls which define a longitudinal passageway having an axis that is aligned with the longitudinal axis of said deflector means when said tubular chute and said deflector means are attached to each other, one end of said chute member being adapted to mate with said discharge opening, the opposite end of said chute member being adapted to receive a grass-catching bag; and
   d. elongated mating channel and projection means, one each carried by said chute and said deflector, said elongated mating channel and projection means each having a longitudinal axis parallel to the aligned axes of said deflector means and said discharge passageway, whereby an operator may attach said chute member to said mower by the axial insertion of said chute member in said deflector means with said elongated channel and projection means cooperating in attachment to permit rotation of said deflector means upward by movement of the inserted chute member downward into contact with said housing.

2. The structure of claim 1, wherein said housing is formed to define a protruding stop in the upper surface thereof, and said chute member has latch means which contacts said stop when the chute member is inserted into the deflector means and is urged downward into contact with said housing by said yieldable means.

3. The structure of claim 2 wherein said latch means comprises a protrusion attached to said chute member, at least a portion of said protrusion being ramp-shaped in a direction parallel to the axis of said chute member passageway.

4. The structure of claim 1 wherein said yieldable means includes a torsion spring, having one end thereof fixed to said deflector means and the opposite end thereof fixed to said housing, with a central portion thereof aligned along the hinge axis of said deflector means, and said deflector means is formed to define a plurality of hinge loops through which said central portion extends.

5. The structure of claim 1 wherein said tubular chute member has a front opening formed to surround and mate with said discharge opening, and includes an inwardly projecting clearing wall for holding clippings present in said chute member during disconnection thereof from said housing and deflector means.

6. The structure of claim 1 wherein said deflector means carries a pair of oppositely directed longitudinally extending channels and said second chute member carries a pair of oppositely directed longitudinally extending rail members for insertion in said channels, whereby mating engagement of said deflector means and said chute member may be accomplished.

7. The structure of claim 6 wherein said tubular chute member has a top wall, two edges of which are defined by portions of said rail members, and said deflector means includes a top wall, two edges of which are formed into said channels.

8. The structure of claim 7 further including cantilevered handle means fastened to said top wall of said chute member.

9. The structure of claim 8 wherein said housing includes stop means extending vertically upward from the top surface thereof and said chute member includes a ramp-shaped projection positioned for engagement with said stop means to positively lock said chute member to said housing.

10. In combination with a rotary mower having a housing defining a substantial cylindrical chamber in which a blade is mounted for rotation about a substantially vertical axis, said housing having a discharge opening therein, discharge and bagging apparatus comprising:

a. a discharge deflector hingedly fastened to said housing above said discharge opening in a position to be rotatable downward to shield said opening, said deflector including a top wall to which a pair of opposed side walls are attached to define a discharge passageway extending longitudinally outward from said opening;
   b. a discharge chute defining a transport passageway therein for transport of air and grass clippings to a collecting receptacle, one end of said discharge chute being longitudinally insertable into the discharge passageway defined by said deflector; said chute and said deflector including means providing mating engagement therebetween upon such insertion so that said deflector and chute are rotatable as a unit following said engagement;
   c. spring means associated with said deflector and operable to continually urge said deflector toward a downward position shielding said opening, so that said deflector may shield said opening when said chute is not inserted therein, and said chute may be urged into engagement with said housing by said spring means when said chute is inserted into mating engagement with said deflector; and
   d. latch means on said housing in the path of downward rotation of the body of said chute when in mating engagement with said deflector, said latch means engageable with said chute for preventing withdrawal of said chute from engagement with said deflector, said spring means urging said chute into engagement with said latch means when said chute is inserted within said deflector into mating engagement therewith.

11. The structure of claim 10 wherein said means providing mating engagement between said chute and said deflector comprises elongated mating channel and projection means, one each carried by said chute and said deflector.

12. The apparatus of claim 10 wherein said discharge chute further includes a protrusion having a stop surface thereon and said latch means comprises a hook-shaped ridge positioned adjacent said discharge opening and carried by said housing, to contact said stop surface when said chute and said deflector are in mating longitudinal engagement, thereby positively fastening said chute to said deflector.

13. The structure of claim 10 further including handle means carried by said chute to facilitate handling thereof and insertion thereof into engagement with said deflector.

* * * * *

UNITED STATES PATENT AND TRADEMARK OFFICE
CERTIFICATE OF CORRECTION

PATENT NO. : 4,047,367
DATED : September 13, 1977
INVENTOR(S) : Richard A. Thorud It is certified that error appears in the above-identified patent and that said Letters Patent are hereby corrected as shown below:

Column 1, line 15, after "mower" insert --or--;

Column 4, line 32, delete "delfector" and insert --deflector--

Column 5, line 40, delete "to" and insert --of--.

Signed and Sealed this

Twenty-seventh Day of December 1977

[SEAL]

Attest:

RUTH C. MASON
Attesting Officer

LUTRELLE F. PARKER
Acting Commissioner of Patents and Trademarks